United States Patent [19]

O'Donnell

[11] Patent Number: 5,142,649
[45] Date of Patent: Aug. 25, 1992

[54] ULTRASONIC IMAGING SYSTEM WITH MULTIPLE, DYNAMICALLY FOCUSED TRANSMIT BEAMS

[75] Inventor: Matthew O'Donnell, Ann Arbor, Mich.

[73] Assignee: General Electric Company, Schenectady, N.Y.

[21] Appl. No.: 741,875

[22] Filed: Aug. 7, 1991

[51] Int. Cl.⁵ .............................................. G03B 42/06
[52] U.S. Cl. ........................................................ 367/7
[58] Field of Search .......................... 367/7, 101, 138; 128/661.01; 73/620, 626; 364/413.25

[56] References Cited

U.S. PATENT DOCUMENTS

| | | | |
|---|---|---|---|
| 4,154,113 | 5/1979 | Engeler | 73/626 |
| 4,155,258 | 5/1979 | Engeler et al. | 73/626 |
| 4,155,259 | 5/1979 | Engeler | 73/626 |
| 4,155,260 | 5/1979 | Engeler et al. | 73/626 |
| 4,180,790 | 12/1979 | Thomas | 367/7 |
| 4,217,684 | 9/1980 | Brisken et al. | 29/25.35 |
| 4,425,525 | 1/1984 | Smith et al. | 310/336 |
| 4,441,503 | 4/1984 | O'Donnell | 128/663.01 |
| 4,456,982 | 6/1984 | Tournois | 367/101 |
| 4,470,303 | 9/1984 | O'Donnell | 73/602 |
| 4,470,305 | 9/1984 | O'Donnell | 73/626 |
| 4,569,231 | 2/1986 | Carnes et al. | 73/626 |
| 4,662,223 | 5/1987 | Riley et al. | 73/626 |
| 4,669,314 | 6/1987 | Magrane | 73/610 |
| 4,809,184 | 2/1989 | O'Donnell et al. | 364/413.25 |
| 4,835,689 | 5/1989 | O'Donnell | 364/413.25 |
| 4,839,652 | 6/1989 | O'Donnell et al. | 341/122 |
| 4,886,069 | 12/1989 | O'Donnell | 128/661.01 |
| 4,896,287 | 1/1990 | O'Donnell et al. | 364/754 |
| 4,983,970 | 1/1991 | O'Donnell et al. | 341/122 |
| 5,005,419 | 4/1991 | O'Donnell et al. | 73/626 |
| 5,014,712 | 5/1991 | O'Donnell | 128/661.01 |

OTHER PUBLICATIONS

S. C. Leavitt et al., "A Scan Conversion Algorithm for Displaying Ultrasound Images", Hewlett-Packard Journal, Oct. 1983, pp. 30–34.

Primary Examiner—Daniel T. Pihulic
Attorney, Agent, or Firm—Marvin Snyder; James C. Davis, Jr.

[57] ABSTRACT

A phased array sector scanning (PASS) ultrasonic imaging system produces a steered transmit beam with an array of transducer elements that are driven with separate carrier frequencies. A receiver forms the echo signal into a receive beam steered in the same direction as the transmit beam and is dynamically focused. A transmit beam processor Fourier transforms this receive beam to produce a signals corresponding to the separate carrier frequencies which can be delayed to retrospectively dynamically focus the transmit beam or alter the direction in which it is steered.

11 Claims, 8 Drawing Sheets

ULTRASONIC IMAGING SYSTEM WITH MULTIPLE, DYNAMICALLY FOCUSED TRANSMIT BEAMS

BACKGROUND OF THE INVENTION

This invention relates to coherent imaging systems using vibratory energy and, in particular, to phased array sector scanning ultrasound imaging systems.

There are a number of modes in which vibratory energy, such as ultrasound, can be used to produce images of objects. The ultrasound transmitter may be placed on one side of the object and the sound transmitted through the object to the ultrasound receiver placed on the other side ("transmission mode"). With transmission mode methods, an image may be produced in which the brightness of each pixel is a function of the amplitude of the ultrasound that reaches the receiver ("attenuation" mode), or the brightness of each pixel is a function of the time required for the sound to reach the receiver ("time-of-flight" or "speed of sound" mode). In the alternative, the receiver may be positioned on the same side of the object as the transmitter and an image may be produced in which the brightness of each pixel is a function of the amplitude or time-of-flight of the ultrasound reflected from the object back to the receiver ("refraction", "backscatter" or "echo" mode). The present invention relates to a backscatter method for producing ultrasound images.

There are a number of well known backscatter methods for acquiring ultrasound data. In the so-called "A-scan" method, an ultrasound pulse is directed into the object by the transducer and the amplitude of the reflected sound is recorded over a period of time. The amplitude of the echo signal is proportional to the scattering strength of the refractors in the object and the time delay is proportional to the range of the refractors from the transducer. In the so-called "B-scan" method, the transducer transmits a series of ultrasonic pulses as it is scanned across the object along a single axis of motion. The resulting echo signals are recorded as with the A-scan method and either their amplitude or time delay is used to modulate the brightness of pixels on a display. With the B-scan method, enough data are acquired from which an image of the refractors can be reconstructed.

In the so-called C-scan method, the transducer is scanned across a plane above the object and only the echoes reflecting from the focal depth of the transducer are recorded. The sweep of the electron beam of a CRT display is synchronized to the scanning of the transducer so that the x and y coordinates of the transducer correspond to the x and y coordinates of the image.

Ultrasonic transducers for medical applications are constructed from one or more piezoelectric elements sandwiched between a pair of electrodes. Such piezoelectric elements are typically constructed of lead zirconate titanate (PZT), polyvinylidene difluoride (PVDF), or PZT ceramic/polymer composite. The electrodes are connected to a voltage source, and when a voltage is applied, the piezoelectric elements change in size at a frequency corresponding to that of the applied voltage. When a voltage pulse is applied, the piezoelectric element emits an ultrasonic wave into the media to which it is coupled at the frequencies contained in the excitation pulse. Conversely, when an ultrasonic wave strikes the piezoelectric element, the element produces a corresponding voltage across its electrodes. Typically, the front of the element is covered with an acoustic matching layer that improves the coupling with the media in which the ultrasonic waves propagate. In addition, a backing material is disposed to the rear of the piezoelectric element to absorb ultrasonic waves that emerge from the back side of the element so that they do not interfere. A number of such ultrasonic transducer constructions are disclosed in U.S. Pat. Nos. 4,217,684, 4,425,525, 4,441,503, 4,470,305 and 4,569,231, all of which are assigned to the instant assignee.

When used for ultrasound imaging, the transducer typically has a number of piezoelectric elements arranged in an array and driven with separate voltages (apodizing). By controlling the time delay (or phase) and amplitude of the applied voltages, the ultrasonic waves produced by the piezoelectric elements (transmission mode) combine to produce a net ultrasonic wave focused at a selected point. By controlling the time delay and amplitude of the applied voltages, this focal point can be moved in a plane to scan the subject.

The same principles apply when the transducer is employed to receive the reflected sound (receiver mode). That is, the voltages produced at the transducer elements in the array are summed together such that the net signal is indicative of the sound reflected from a single focal point in the subject. As with the transmission mode, this focused reception of the ultrasonic energy is achieved by imparting separate time delays (and-/or phase shifts) and gains to the signal from each transducer array element.

This form of ultrasonic imaging is referred to as "phased array sector scanning", or "PASS". Such a scan is comprised of a series of measurements in which the steered ultrasonic wave is transmitted, the system switches to receive mode after a short time interval, and the reflected ultrasonic wave is received and stored. Typically, the transmission and reception are steered in the same direction ($\theta$) during each measurement to acquire data from a series of points along a scan line. The receiver is dynamically focused at a succession of ranges (R) along the scan line as the reflected ultrasonic waves are received. The time required to conduct the entire scan is a function of the time required to make each measurement and the number of measurements required to cover the entire region of interest at the desired resolution and signal-to-noise ratio. For example, a total of 128 scan lines may be acquired over a 90 degree sector, with each scan line being steered in increments of 0.70°. A number of such ultrasonic imaging systems are disclosed in U.S. Pat. Nos. 4,155,258, 4,155,260, 4,154,113, 4,155,259, 4,180,790, 4,470,303, 4,662,223, 4,669,314 and 4,809,184, all of which are assigned to the instant assignee.

The ability of current ultrasonic imaging systems to steer and dynamically focus the ultrasonic energy while in the receive mode far exceeds the ability to form beams, steer them and dynamically focus them while in the transmit mode. For example, in U.S. Pat. No. 4,886,069 which issued on Dec. 12, 1989 and is entitled "Method Of, And Apparatus For Obtaining A Plurality Of Different Return Energy Imaging Beams Responsive to a Single Excitation", I disclose a method for forming two separate, steered and dynamically focused beams from each received ultrasonic echo signal. Thus, a single ultrasonic transmission may be steered in a particular direction ($\theta$) and focused at a particular range (R) with the simultaneous production of two dynamically focused receive beams disposed on each side of the transmit beam angle ($\theta$) by an amount $\pm\Delta\theta$. This enables the total scan time to be reduced because fewer pulse transmissions are now required to produce the same number of received beams.

The inability to precisely coordinate transmit beam steering with receive beam steering and the inability to dynamically focus the transmit beam results in a reduction in signal-to-noise ratio and resolution in the reconstructed image. It can be appreciated that a peak signal will be produced when the echo signal is received from reflectors which are located along the transmit beam direction ($\theta$). By forming multiple receive beams using the teachings of the above-cited patent, however, the receiver beam angle is offset by an angle $\pm\Delta\theta$ from this transmit beam angle ($\theta$) with a consequent reduction in signal strength. Similarly, the transmit beam sharply focuses the ultrasonic energy on reflectors located at a particular range (R), while the receiver dynamically changes its focus over a relatively large range of values as the ultrasonic echo signal is received. Where the dynamic focus of the receiver corresponds to the fixed focus of the transmitter, the image quality is best.

SUMMARY OF THE INVENTION

The present invention relates to a method and apparatus for retrospectively producing multiple steered and dynamically focused transmit beams for an ultrasonic imaging system. More particularly, the ultrasonic imaging system according to the present invention produces a pulse of ultrasonic energy from a multi-element transducer array in which each element of the array is driven with a signal having a different frequency, in which the ultrasonic echo signal is received by the multi-element transducer array and formed into a steered and focused receive beam, in which the receive beam is Fourier transformed to produce a set of component signals corresponding to the different frequencies used to drive each element of the array, and in which each component signal in the set is delayed by an amount determined by the location of its corresponding element in the array. The delay applied to each component signal may be set to retrospectively focus the transmit beam dynamically as the echo signal is received and processed, or it may be set to retrospectively steer the transmit beam to either side of the beam angle ($\theta$).

A general object of the invention is to retrospectively control the transmit beam direction and focus. The transmitted pulse of ultrasonic energy is frequency encoded to indicate the contribution each transducer array element makes to the subsequently received echo signal. Decoding is accomplished by Fourier transforming the received echo signal and each decoded component is delayed by an amount which corresponds to the location of the array element which transmitted it.

Another object of the invention is to dynamically focus the transmit beam in a PASS ultrasonic imaging system. The same delays used to dynamically focus the receive beam can also be used to retrospectively focus the transmit beam. The amount of the delay is a function of range (R) and the location of the transmitting array element in the transducer array. Both of these variables are known by employing the frequency encoding of the present invention.

Yet another general object of the invention is to retrospectively focus and steer a plurality of transmit beams to correspond with a plurality of dynamically focused receive beams. For each dynamically focused receive beam formed, a Fourier transformation is performed to produce the component signals. Each set of component signals is then delayed to provide dynamic focusing and steering that matches the receive beam from which the component signals are produced.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
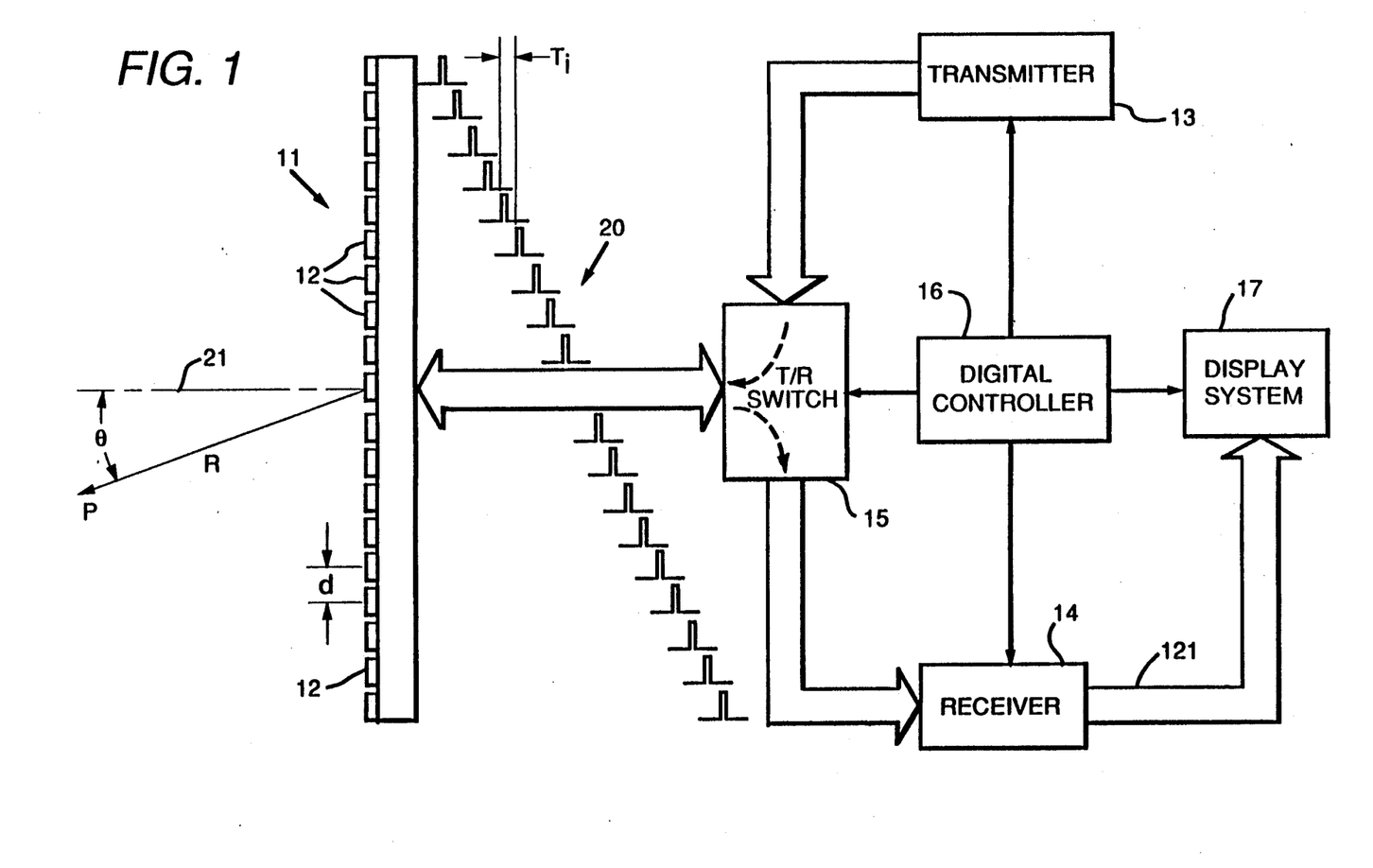
FIG. 1 is a block diagram of a vibratory energy imaging system which employs the present invention.

Referring particularly to FIG. 1, a vibratory energy imaging system includes a transducer array 11 comprised of a plurality of separately driven elements 12 which each produce a burst of vibratory energy, such as ultrasonic energy, when energized by a pulse produced by a transmitter 13. The vibratory energy reflected back to transducer array 11 from the subject under study is converted to an electrical signal by each transducer element 12 and applied separately to a receiver 14 through a set of switches 15. Transmitter 13, receiver 14 and switches 15 are operated under control of a digital controller 16 responsive to commands by a human operator. A complete scan is performed by acquiring a series of echoes in which switches 15 are set to their transmit position, transmitter 13 is gated on momentarily to energize each transducer element 12, switches 15 are then set to their receive position, and the subsequent echo signals produced by each transducer element 12 are applied to receiver 14. The separate echo signals from each transducer element 12 are combined in receiver 14 to produce a single echo signal which is employed to produce a line in an image on a display system 17.

Transmitter 13 drives transducer array 11 such that the vibratory energy produced, e.g., ultrasonic energy, is directed, or steered, in a beam. A B-scan can therefore be performed by moving this beam through a set of angles from point-to-point rather than physically moving transducer array 11. To accomplish this, transmitter 13 imparts a time delay ($T_i$) to the respective pulses 20 that are applied to successive transducer elements 12. If the time delay is zero ($T_i=0$), all the transducer elements 12 are energized simultaneously and the resulting ultrasonic beam is directed along an axis 21 normal to the transducer face and originating from the center of transducer array 11. As the time delay ($T_i$) is increased, as illustrated in FIG. 1, the ultrasonic beam is directed downward from central axis 21 by an angle $\theta$. The relationship between the time delay increment $T_i$ added successively to each $i^{th}$ signal from one end of the transducer array ($i=1$) to the other end ($i=N$) is given by the following relationship:

$$T_i = -(i-(n-1)/2)d \sin\theta/c + (i-(n-1/2)^2 d^2 \cos^2 \theta/2R_Tc + T_0 \quad (1)$$

where
d = equal spacing between centers of adjacent transducer elements 12,
c = the velocity of sound in the object under study.
$R_T$ = range at which transmit beam is to be focused.
$T_0$ = delay offset which insures that all calculated values ($T_i$) are positive values.

The first term in this expression steers the beam in the desired angle $\theta$, and the second is employed when the transmitted beam is to be focused at a fixed range. A sector scan is performed by progressively changing time delays $T_i$ in successive excitations. The angle $\theta$ is thus changed in increments to steer the transmitted beam in a succession of directions. When the direction of the beam is above central axis 21, the timing of pulses 20 is reversed, but the formula of equation (1) still applies.

Referring still to FIG. 1, the echo signals produced by each burst of ultrasonic energy emanate from reflecting objects located at successive positions along the ultrasonic beam. These are sensed separately by each segment 12 of transducer array 11 and a sample of the magnitude of the echo signal at a particular point in time represents the amount of reflection occurring at a specific range (R). Due to differences in the propagation paths between a focal point P and each transducer element 12, however, these echo signals will not occur simultaneously and their amplitudes will not demodulate these separate echo signals, impart the proper time delay to each and sum them together to provide a single echo signal which accurately indicates the total ultrasonic energy reflected from each focal point P located at range R along the ultrasonic beam oriented at the angle $\theta$.

To simultaneously sum the electrical signals produced by the echoes from each transducer element 12, time delays are introduced into each separate transducer element channel of receiver 14. In the case of linear array 11, the delay introduced in each channel may be divided into two components; one component is referred to as a beam steering time delay, and the other component is referred to as a beam focusing time delay. The beam steering and beam focusing time delays for reception are precisely the same delays ($T_i$) as the transmission delays described above. However, the focusing time delay component introduced into each receiver channel is continuously changing during reception of the echo to provide dynamic focusing of the received beam at the range R from which the echo signal emanates. This dynamic focusing delay component is as follows:

$$T_k = (k-(n-1)/2)^2 d^2 \cos^2\theta/2Rc \quad (2)$$

where
R = the range of the focal point P from the center of the array 11;
C = the velocity of sound in the object under study; and
$T_k$ = the desired time delay associated with the echo signal from the $k^{th}$ element to coherently sum it with the other echo signals.

Under direction of digital controller 16, receiver 14 provides delays during the scan such that steering of receiver 14 tracks with the direction ($\theta$) of the beam steered by transmitter 13 and it samples the echo signals at a succession of ranges (R) and provides the proper delays to dynamically focus at points P along the beam. Thus, each emission of an ultrasonic pulse results in reception of a series of echo signal samples which represent the amount of reflected sound from a corresponding series of points P located along the ultrasonic beam. Receiver 14 is able to change its delays for each echo signal sample to dynamically focus on the reflectors which produce the signal sample. The stream of focused and steered echo signal samples which are produced by the receiver is referred to in the art as the "received beam".

Display system 17 receives the series of data samples produced by receiver 14 and converts the data to a form producing the desired image. For example, if an A-scan is desired, the magnitude of the series of data points is merely graphed as a function of time. If a B-scan is desired, each data point in the series is used to control brightness of a pixel in the image, and a scan comprised of a series of measurements at successive steering angles ($\theta$) is performed to provide the data necessary for display.

Figure 2:
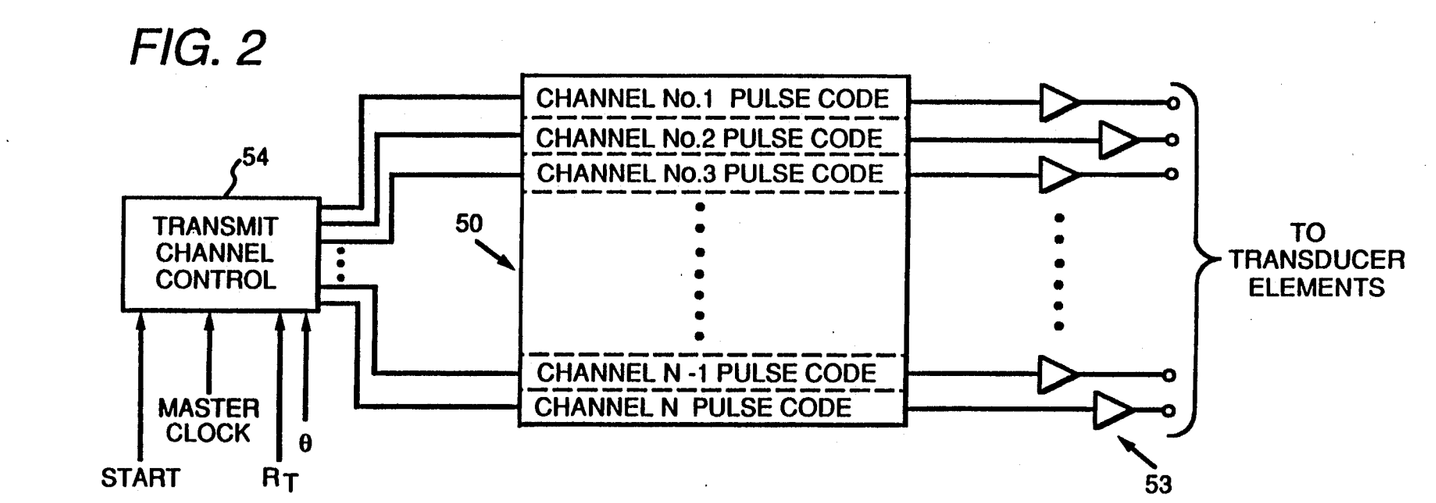
FIG. 2 is a block diagram of a transmitter which forms part of the system of FIG. 1.

Referring to FIG. 2 in conjunction with FIG. 1, transmitter 13 includes a set of channel pulse code memories indicated collectively as memories 50. In the preferred embodiment, there are 64 separate transducer elements 12, and therefore, there are 64 separate channel pulse code memories 50. Each pulse code memory 50 is typically a 1-bit by 512-bit memory which stores a bit pattern 51 that determines the frequency of ultrasonic pulse 52 to be produced. In the preferred embodiment, this bit pattern is read out of each pulse code memory 50 by a 40 MHz master clock and applied to a driver 53 which amplifies the signal to a power level suitable for driving transducer 11. Transducer elements 12 to which these ultrasonic pulses 52 are applied respond by producing ultrasonic energy. If all 512 bits are used, then a pulse of bandwidth as narrow as 40 kHz centered on the carrier frequency will be emitted. In a conventional PASS ultrasonic imaging system all of the transducer elements 12 are excited with the same carrier frequency and each pulse has a broad bandwidth.

Figure 2A:
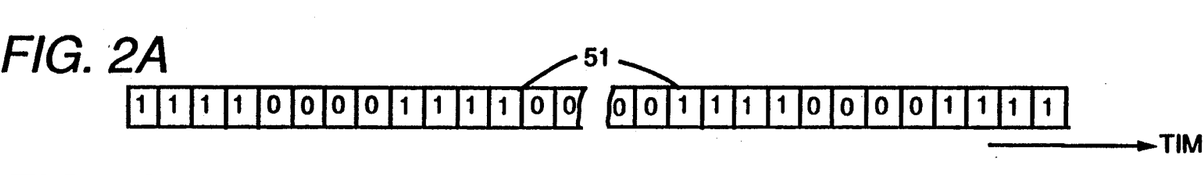
FIGS. 2A and 2B are graphical illustrations of the signal in any of the channels of transmitter 50 of FIG. 2.

To carry out the teachings of the present invention, the separate excitations of transducer array elements 12 are uniquely frequency encoded. This is accomplished by assigning a different carrier frequency to each channel 50 of transmitter 13 and spacing the carrier frequencies apart such that they can be separated out of the echo signal by receiver 14 as will be described in detail below. In the preferred embodiment the 64 separate carrier frequencies are spaced apart by 40 kHz to occupy a total bandwidth of 2.5 MHz centered on 5 MHz. This requires that a separate bit pattern be stored in each channel pulse code memory 50, so that carrier frequencies ranging from 3.74 MHz to 6.26 MHz in 40 kHz steps are produced. A segment of one such bit pattern 51 for a 5 MHz carrier frequency is illustrated in FIG. 2A and is comprised of a sequence of four "1" bits alternated with four "0" bits.

While it is useful for explaining how the present invention functions to fix the order in which the separate transmit channels are frequency encoded, in practice this order is random and it may be changed during the scan. This is done so that the time delay and frequency variation functions across transducer array 11 are not correlated. To decouple space and time information, the frequency encoding distribution across the N elements 12 of array 11 is random. Further randomization of the frequency encoding distribution as a function of both beam angle (θ) and time can be used with signal averaging methods to reduce sidelobe levels. Whatever frequency encoding distribution pattern is used in transmitter 13, however, must also be used in the decoding process employed by receiver 14 as will be described below.

Figure 2B:
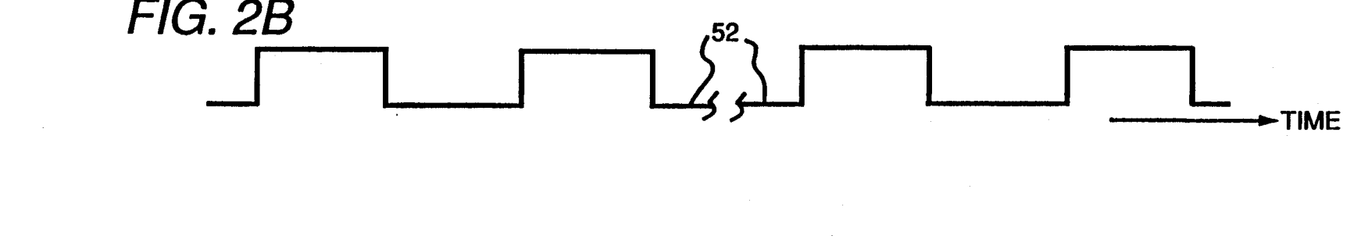

As indicated above, to steer the transmitted beam of the ultrasonic energy in the desired direction (θ), pulses 52 for each of the N channels, such as shown in FIG. 2B, must be delayed by the proper amount. These delays are provided by a transmit control 54 which receives four control signals (START, MASTER CLOCK, $R_T$ and θ) from digital controller 16 (FIG. 1). Using the input control signal θ, the fixed transmit focus $R_T$, and the above equation (1), transmit control 54 calculates the delay increment $T_i$ required between successive transmit channels. When the START control signal is received, transmit control 54 gates one of four possible phases of the 40 MHz MASTER CLOCK signal through to the first transmit channel 50. At each successive delay time interval ($T_i$) thereafter, one of the phases of the 40 MHz MASTER CLOCK signal is gated through to the next channel pulse code memory 50 until all N=64 channels are producing their ultrasonic pulses 52. Each transmit channel 50 is reset after its entire bit pattern 51 has been transmitted and transmitter 13 then waits for the next θ and next START control signals from digital controller 16. As indicated above, in the preferred embodiment of the invention a complete B-scan is comprised of 128 ultrasonic pulses steered in Δθ increments of 0.70 degrees through a 90 degree sector centered about the central axis 21 (FIG. 1) of the transducer 11.

For a detailed description of transmitter 13, reference is made to commonly assigned U.S. Pat. No. 5,014,712, issued Jan. 28, 1991 and entitled "Coded Excitation For Transmission Dynamic Focusing of Vibratory Energy Beam", incorporated herein by reference.

Figure 3:
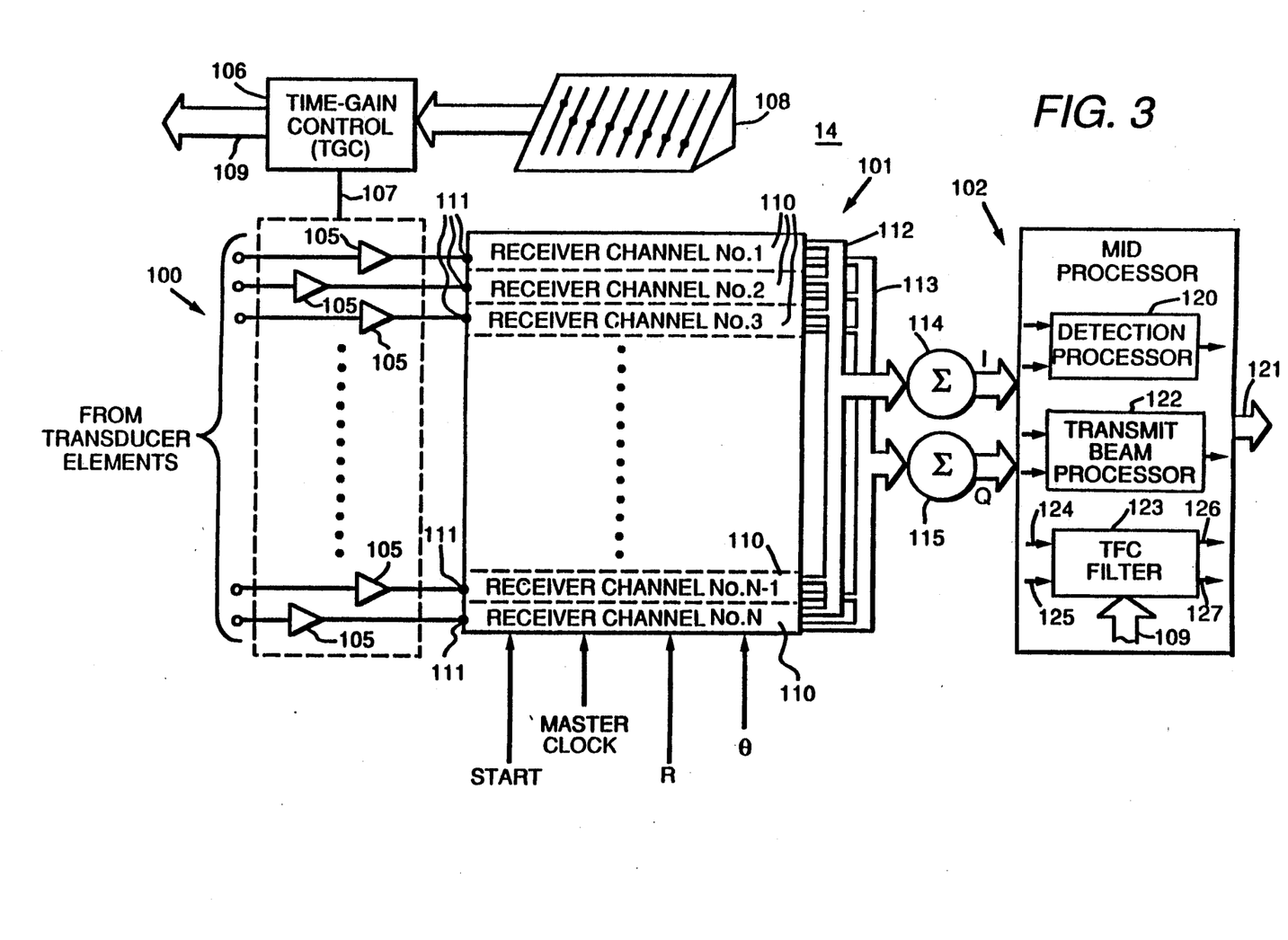
FIG. 3 is a block diagram of a receiver which forms part of the system of FIG. 1.

Referring particularly to FIG. 3 in conjunction with FIG. 1, receiver 14 is comprised of three sections: a time-gain control section 100, a receive beam forming section 101, and a mid processor 102. Time-gain control section 100 includes an amplifier 105 for each of the N=64 receiver channels and a time-gain control circuit 106. The input of each amplifier 105 is connected to a respective one of transducer elements 12 to receive and amplify the echo signal which it receives. The amount of amplification provided by amplifiers 105 is controlled through a control line 107 that is driven by time-gain control circuit 106. As is well known in the art, as the range of the echo signal increases, its amplitude is diminished. As a result, unless the echo signal emanating from more distant reflectors is amplified more than the echo signal from nearby reflectors, the brightness of the image diminishes rapidly as a function of range (R). This amplification is controlled by the operator who manually sets eight (typically) TGC linear potentiometers 108 to values which provide a relatively uniform brightness over the entire range of the sector scan. The time interval over which the echo signal is acquired determines the range from which it emanates, and this time interval is divided into eight segments by TGC control circuit 106. The settings of the eight potentiometers are employed to set the gains of amplifiers 105 during each of the eight respective time intervals so that the echo signal is amplified in ever increasing amounts over the echo signal acquisition time interval.

The receive beam forming section 101 of receiver 14 includes N=64 separate receiver channels 110. As will be explained in more detail below, each receiver channel 110 receives the analog echo signal from one of TGC amplifiers 105 at an input 111, and it produces a stream of digitized output values on an I bus 112 and a Q bus 113. Each of these I and Q values represents a sample of the echo signal envelope at a specific range (R). These samples have been delayed in the manner described above such that when they are summed at summing points 114 and 115 with the I and Q samples from each of the other receiver channels 110, they indicate the magnitude and phase of the echo signal reflected from a point P located at range R on the steered beam (θ). In the preferred embodiment, each echo signal is sampled at equal intervals of about 150 micrometers over the entire range of the scan line (typically 40 to 200 millimeters).

For a more detailed description of receiver 14, reference is made to U.S. Pat. No. 4,983,970 which issued on Jan. 8, 1991 and is entitled "Method And Apparatus for Digital Phase Array Imaging", and which is incorporated herein by reference.

Referring still to FIG. 3, mid processor section 102 receives the receive beam samples from summing points 114 and 115. The I and Q values of each beam sample are 16-bit digital numbers representing the in-phase and quadrature components of the magnitude of reflected sound from a point (R,θ). Mid processor 102 can perform a variety of calculations on these beam samples, where choice is determined by the type of image to be reconstructed. For example, if a conventional magnitude image is to be produced, a detection processor indicated at 120 is implemented in which a digital magnitude M is calculated from each receive beam sample and produced at output 121 according to $$M = \sqrt{I^2 + Q^2}.$$

The detection processor 120 may also implement correction methods such as that disclosed in U.S. Pat. No. 4,835,689, issued May 30, 1989 and entitled "Adaptive Coherent Energy Beam Formation Using Phase Conjugation". Such correction methods examine the received beam samples and calculate corrective values that can be used in subsequent measurements by the transmitter 13 and receiver 14 to improve beam focusing and steering. Such corrections are necessary, for example, to account for the non-homogeneity of the media through which the sound from each transducer element travels during a scan.

Mid processor 102 also includes a transmit beam processor 122 which receives the I and Q receive beam samples at respective inputs 123 and 124 and produces modified beam samples I' and Q' at respective outputs 125 and 126. Signals on outputs 125 and 126 typically drive the respective inputs 127 and 128 of detection processor 120, and as will be described in more detail below, transmit beam processor 122 performs the decoding and time delay functions which are necessary to practice the present invention. In a first preferred embodiment of the invention, transmit beam processor 122 performs retrospective dynamic focusing of the transmit beam to improve image quality, whereas in a second embodiment of the invention, transmit beam processor 112 performs retrospective steering of two simultaneous transmit beams as well as retrospective focusing of those beams.

Figure 4:
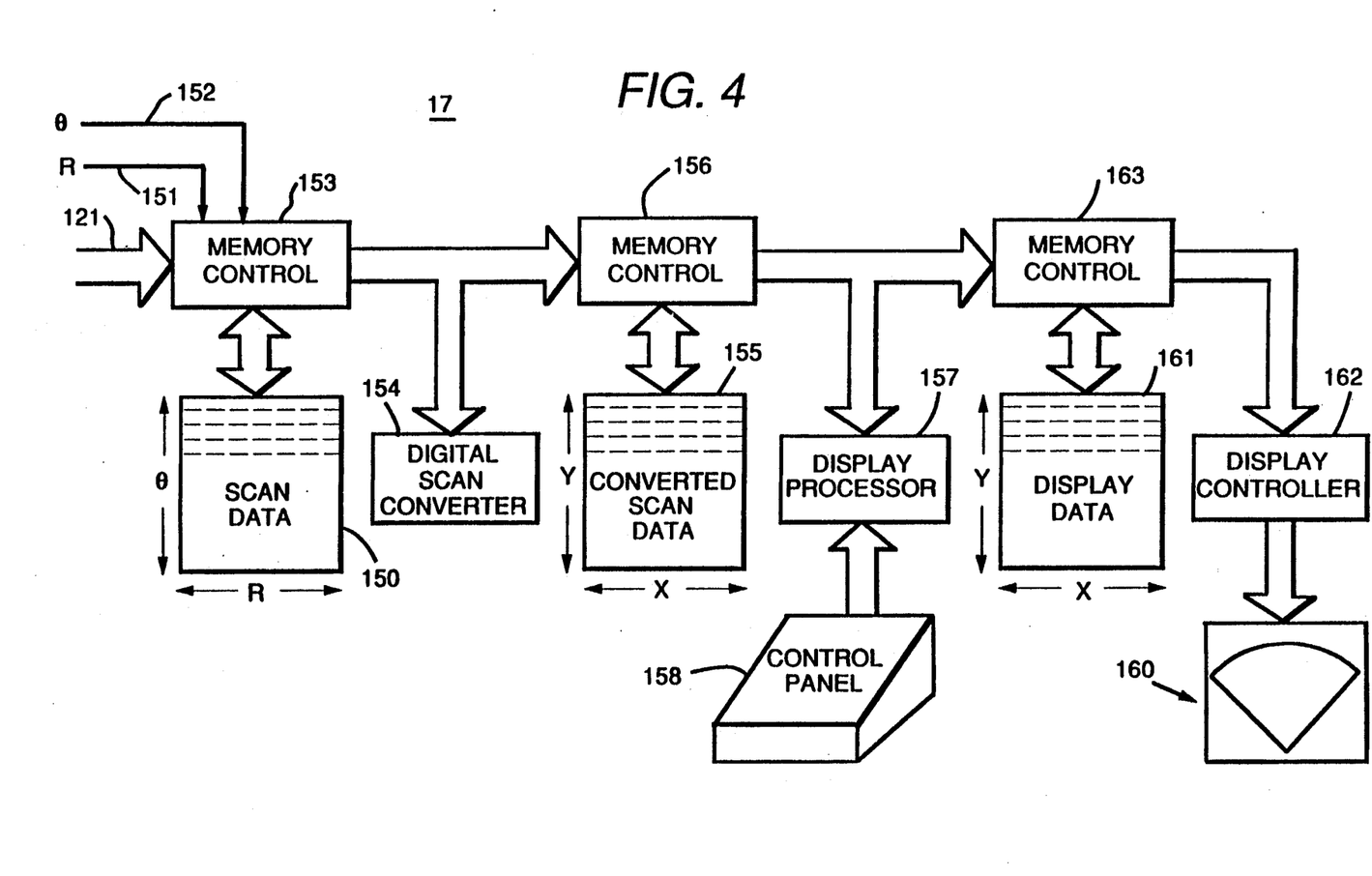
FIG. 4 is a block diagram of a display system which forms part of the system of FIG. 1.

Referring particularly to FIGS. 1 and 4, receiver 14 generates a stream of 8-bit digital numbers at its output 121, which is applied to the input of display system 17. This "scan data" is stored in a memory 150 as an array, with the rows of the scan data array 150 corresponding with the respective beam angles ($\theta$) that are acquired, and the columns of the scan data array 150 corresponding with the respective ranges (R) at which samples are acquired along each beam. The R and $\theta$ control signals 151 and 152 from receiver 14 indicate where each input value is to be stored in array 150, and a memory control circuit 153 writes that value to the proper memory location in array 150. The scan can be continuously repeated and the flow of values from receiver 14 will continuously update the scan data array 150.

Referring still to FIG. 4, the scan data in array 150 are read by a digital scan converter 154 and converted to a form producing the desired image. If a conventional B-scan image is being produced, for example, the magnitude values $M(R,\theta)$ stored in scan data array 150 are converted to magnitude values $M(x,y)$ which indicate magnitudes at pixel locations (x,y) in the image. Such a polar coordinate to Cartisian coordinate conversion of the ultrasonic image data is described, for example, in an article by Steven C. Leavitt et al in *Hewlett-Packard Journal*, October, 1983, pp. 30-33, entitled "A Scan Conversion Algorithm for Displaying Ultrasound Images".

Regardless of the particular conversion made by digital scan converter 154, the resulting image data is written to a memory 155 which stores a two-dimensional array of converted scan data. A memory control 156 provides dual-port access to memory 155 such that the digital scan converter 154 can continuously update the values therein with fresh data while a display processor 157 reads the updated data. Display processor 157 is responsive to operator commands received from a control panel 158 to perform conventional image processing functions on the converted scan data in memory 155. For example, the range of brightness levels indicated by the converted scan data in memory 155 may far exceed the brightness range of display device 160. Indeed, the brightness resolution of the converted scan data in memory 155 may far exceed the brightness resolution of the human eye, and manually operable controls are typically provided which enable the operator to select a window of brightness values over which maximum image contrast is to be achieved. The display processor reads the converted scan data from memory 155, provides the desired image enhancement, and writes the enhanced brightness values to a display memory 161.

Display memory 161 is shared with a display controller circuit 162 through a memory control circuit 163, and the brightness values therein are mapped to control the brightness of the corresponding pixels in display 160. Display controller 162 is a commercially available integrated circuit which is designed to operate the particular type of display 160 used. For example, display 160 may be a CRT, in which case display controller 162 is a CRT controller chip which provides the required sync pulses for the horizontal and vertical sweep circuits and maps the display data to the CRT at the appropriate time during the sweep.

It should be apparent to those skilled in the art that display system 17 may take one of many forms depending on the capability and flexibility of the particular ultrasound system. In the preferred embodiment described above, programmed microprocessors are employed to implement the digital scan converter and display processor functions, and the resulting display system is, therefore, very flexible and powerful.

Figure 5:
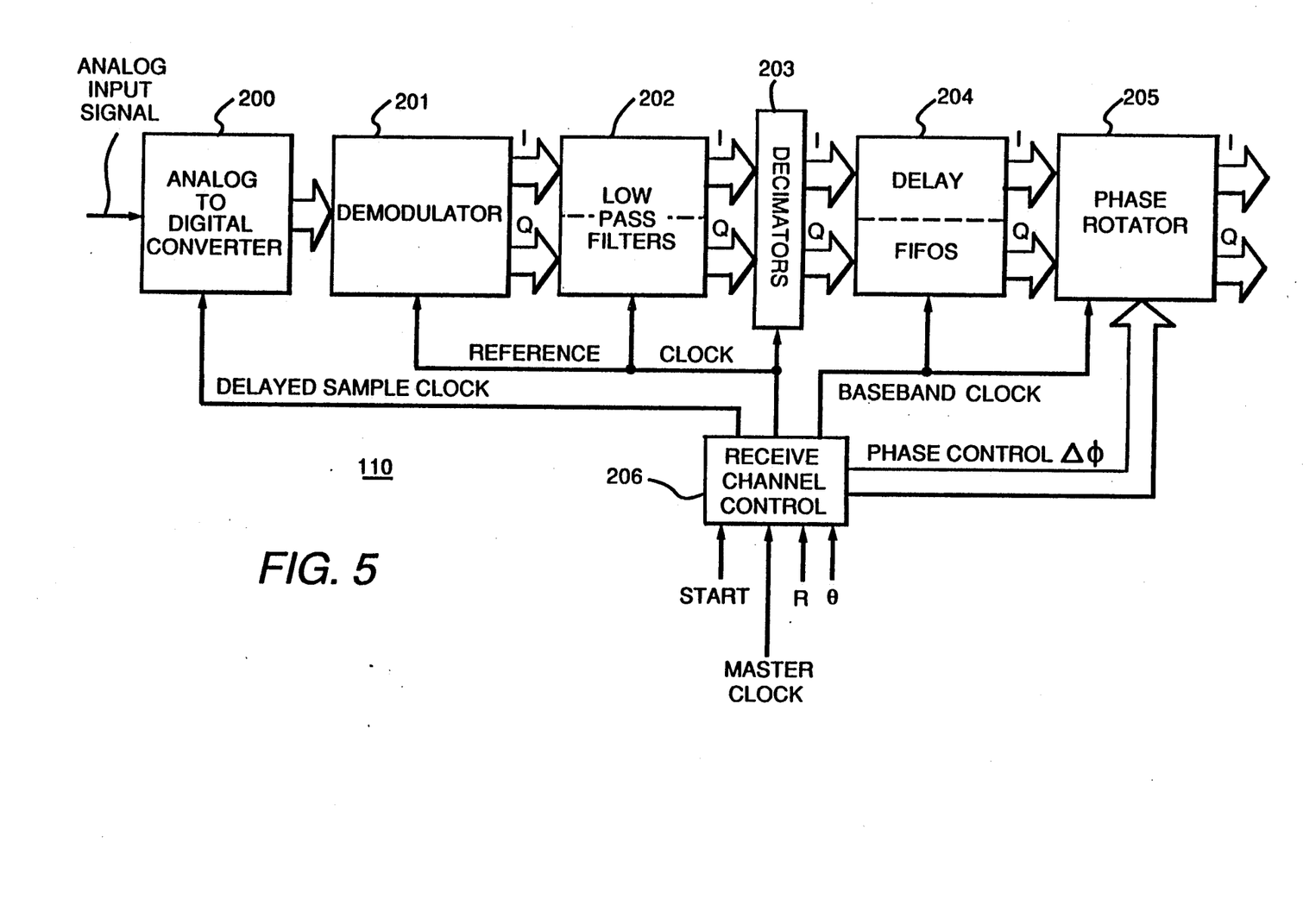
FIG. 5 is a block diagram of a receiver channel which forms part of the receiver of FIG. 3.

As indicated above with reference to FIG. 3, the beam forming section 101 of receiver 14 is comprised of a set of receiver channels 110 — one for each element 12 of transducer 11 (FIG. 1). Referring particularly to FIG. 5, each receiver channel is responsive to a START command, a 40 MHz master clock, a range signal (R) and a beam angle signal ($\theta$) from digital controller 16 (FIG. 1) to perform the digital beam forming functions. These include: sampling the analog input signal in an analog-to-digital converter 200, demodulating the sampled signal in a demodulator 201; filtering out the high frequency sum signals produced by demodulator 201 with low pass filters 202; reducing the data rate in decimaters 203; and time delaying and phase adjusting the resulting digital data stream in delay FIFOs (i.e., first-in/first-out memories) 204 and phase rotator 205. All of these elements are controlled by a receive channel control 206 which produces the required clock and control signals in response to commands from digital controller 16 (FIG. 1). In the preferred embodiment, all of these elements are contained on a single integrated circuit.

Figure 8A:
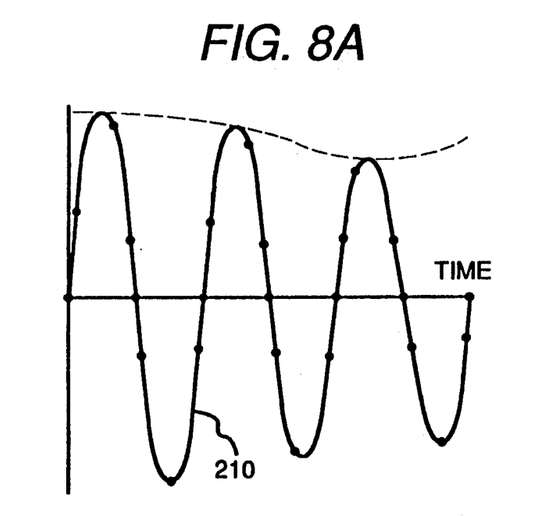
FIGS. 8A-8E are graphical illustrations of the signal at various points in the receiver channel of FIG. 5.
Figure 8B:
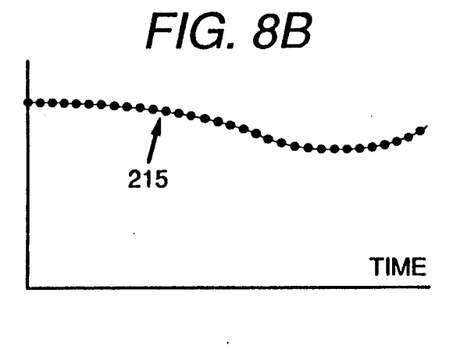

Referring still to FIG. 5, analog-to-digital converter 200 samples the analog input signal, indicated graphically by waveform 210 in FIG. 8A, at regular intervals determined by the leading edge of a delayed sample clock signal from receive channel control 206. In the preferred embodiment the sample clock signal is a 40 MHz clock signal to enable use of ultrasonic frequencies up to 20 MHz without violating the Nyquist sampling criteria. When a 5 MHz ultrasonic carrier frequency is employed, for example, it is sampled eight times per carrier cycle and a 10-bit digital sample is produced at the output of the analog-to-digital converter at a 40 MHz rate. These samples are supplied to demodulator 201 which mixes each sample with both a reference in-phase with the transmitted ultrasonic carrier, and with a reference in quadrature with the transmitted ultrasonic carrier. The demodulator reference signals are produced from stored SINE and COSINE tables that are read out of their respective ROM memories by a 40 MHz reference clock signal from receive channel control 206. The SINE value is digitally multiplied by the sampled input signal to produce a demodulated, in-phase value (I) supplied to low pass filter 202, and the COSINE value is digitally multiplied by the same sampled input signal to produce a demodulated, quadrature phase value Q output signal to a separate low pass filter 202. The low pass filters 202 are finite impulse response filters tuned to pass the difference frequencies supplied by demodulator 201, but block the higher, sum frequencies. As shown by waveform 215 in the graph of FIG. 8B, the output signal of each low pass filter is, therefore, a 40 MHZ stream of digital values which indicate the magnitude of the I or Q component of the echo signal envelope.

For a detailed description of an analog-to-digital converter, demodulator, and a low pass filter circuit reference is made to commonly assigned U.S. Pat. No. 4,839,652 which issued Jun. 13, 1989 and is entitled "Method and Apparatus For High Speed Digital Phased Array Coherent Imaging System".

Figure 8C:
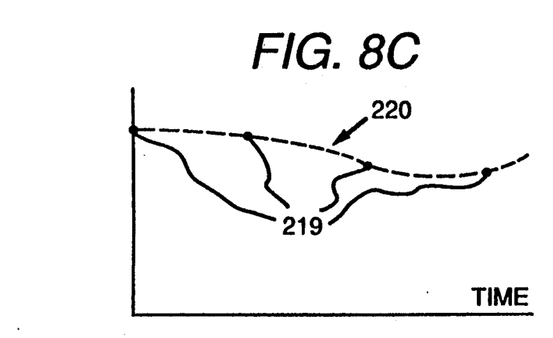

Referring still to FIG. 5, the rate at which the demodulated I and Q components of the echo signal are sampled is reduced by decimators 203. The 12-bit digital samples are supplied to the decimators at a 40 MHz rate which is unnecessarily high from an accuracy standpoint, and which is a difficult data rate to maintain throughout the system. Accordingly, decimators 203 select every eighth digital sample to reduce the data rate down to a 5 MHz rate. This corresponds to the frequency of a baseband clock signal produced by receive channel control 206 and employed to operate the remaining elements in the receiver channel. The I and Q output signals of decimators 203 are thus digitized samples 219 of the echo signal envelope indicated by dashed line 220 in the graph of FIG. 8C. The decimation ratio and the base band clock frequency can be changed to values other than 8:1 and 5 MHz.

Figure 8D:
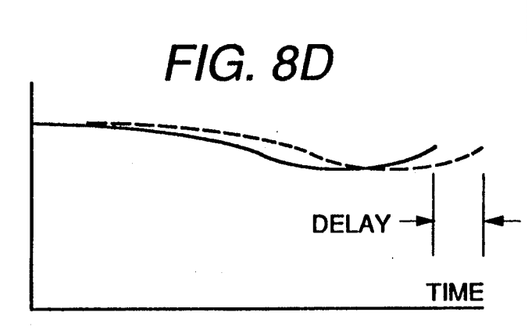

The echo signal envelope represented by the demodulated and decimated digital samples is then delayed by delay FIFOs 204 and phase rotator 205 to provide the desired beam steering and beam focusing. These delays are in addition to the coarse delays provided by the timing of the delayed sample clock signal applied to analog-to-digital converter 200 as described above. That is, the total delay provided by receiver channel 110 is the sum of the delays provided by the delayed sample clock signal supplied to analog-to-digital converter 200, the delay FIFOs 204 and the phase rotator 205. The delay FIFOs 204 are memory devices into which the successive digital sample values are written as they are produced by decimators 203 at a rate of 5 MHz. These stored values are written into successive memory addresses and then read from the memory device and supplied to phase rotator 205. The amount of delay, illustrated graphically in FIG. 8D, is determined by the difference between the memory location from which the digital sample is currently being supplied and the memory location into which the currently received digital sample is being stored. The 5 MHz baseband clock signal establishes 200 nanosecond intervals between stored digital samples and FIFOs 204 can, therefore, provide a time delay measured in 200 nanosecond increments up to their maximum of 25.6 microseconds.

Figure 8E:
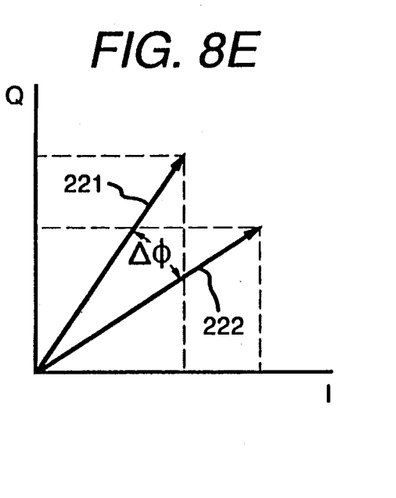

Phase rotator 205 enables the digitized representation of the echo signal to be delayed by amounts less than the 200 nanosecond resolution of delay FIFOs 204. The I and Q digital samples supplied to phase rotator 205 may be represented, as shown in FIG. 8E, by a phasor 221 and the rotated I and Q digital samples produced by phase rotator 205 may be represented by a phasor 222. The magnitudes of the phasors (i.e. the vector sum of the I and Q components of each) are not changed, but the I and Q values are changed with respect to one another such that the output phasor 222 is rotated by an amount $\Delta\phi$ from the input phasor 221. The phase can be either advanced ($+\Delta\phi$) or delayed ($-\Delta\phi$) in response to a phase control signal received on a bus from receive channel control 206. For a detailed description of the phase rotator 205, reference is made to commonly assigned U.S. Pat. No. 4,896,287 which issued on Jan. 23, 1990, entitled "Cordic Complex Multiplier" and which is incorporated herein by reference.

For a general description of receiver channel 110 and a detailed description of how the I and Q output signals of each receiver channel 110 are summed together to form a receive beam signal, reference is also made to commonly assigned U.S. Pat. No. 4,983,970 which issued on Jan. 8, 1991 and is entitled "Method and Apparatus For Digital Phased Array Imaging", and which is incorporated herein by reference.

Figure 6:
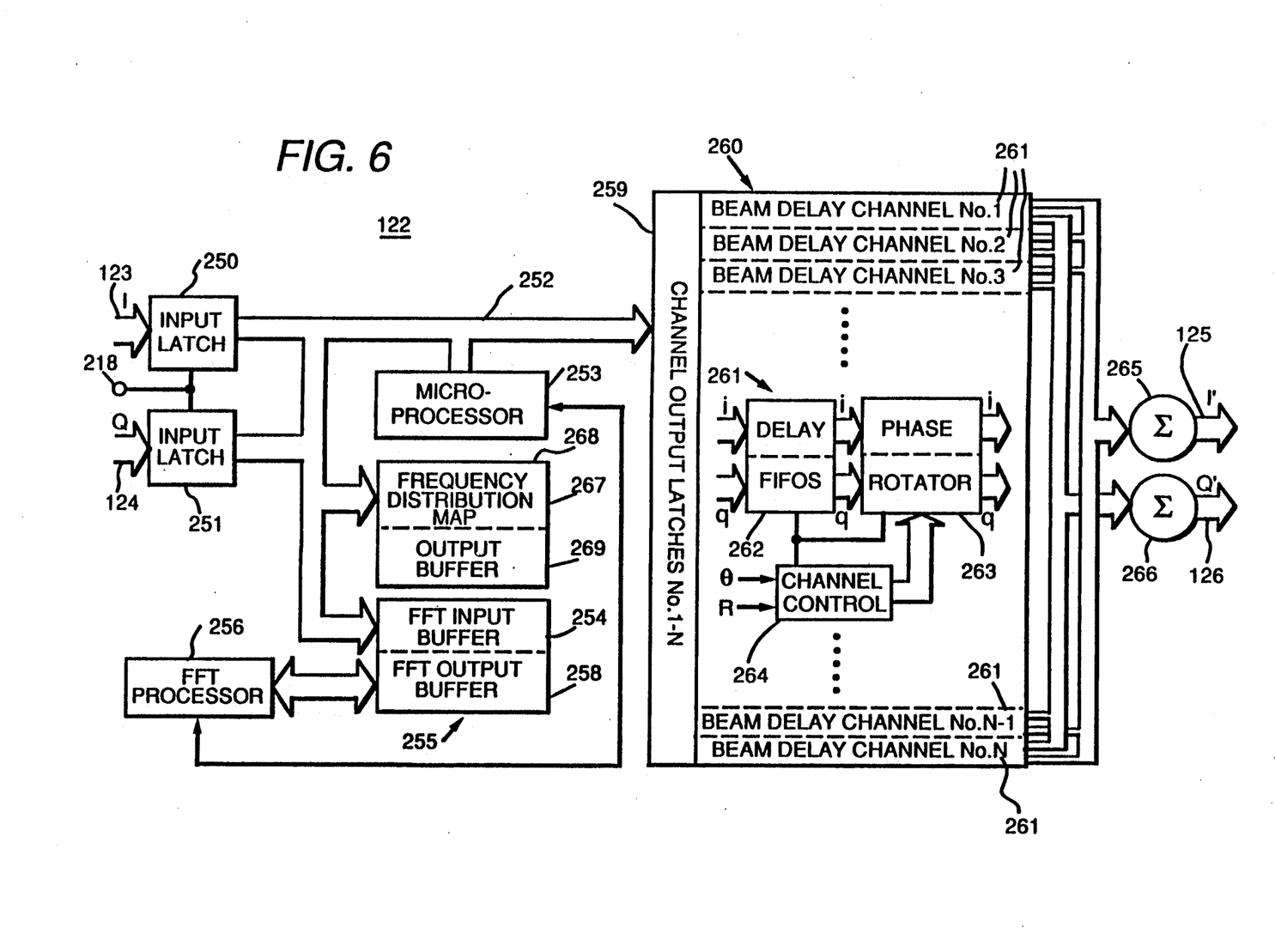
FIG. 6 is an electrical block diagram of a transmit beam processor which forms part of the receiver of FIG. 3.

In FIG. 6, the transmit beam processor 122 receives the I and Q components of the receive beam signal samples at respective inputs 123 and 124. These digital samples are produced at the 5 MHz base band clock rate and each I and Q sample is stored in respective input latches 250 and 251. Latches 250 and 251 connect to a system bus 252 which is controlled by a microprocessor 253, and in response to a stored program (not shown), microprocessor 253 reads the I and Q input samples from latches 250 and 251 and stores them in a fast Fourier transform (FFT) input buffer portion 254 of a dual-port read/write random access memory (RAM) 255. FFT input buffer 254 stores sixty-four consecutive complex input samples and is continuously updated as new samples are acquired.

An FFT processor 256 also connects to dual-port RAM 255 and is configured to read the sixty-four complex values from FFT input buffer 254 when enabled by microprocessor 253. FFT processor 256 is a commercially available integrated circuit configured to perform a fast Fourier transform on the sixty-four complex input buffer samples and produce sixty-four 16-bit complex output values which are written to an FFT output buffer 258 in dual port RAM 255. The FFT processor is available from TRW LSI Products Inc. as the TMC2310, and the FFT processing is in essence parallel filtering of the receive beam samples into their sixty-four separate frequency components. The sixty-four FFT output samples in buffer memory 258 are, therefore, each attributable to the particular transducer array element 12 (FIG. 1) that produced the corresponding carrier frequency. FFT processor 256, of course, sorts these samples into an ascending frequency order.

If the carrier frequencies are distributed in ascending order across transducer array 11 (FIG. 1), then the consecutive FFT output samples in FFT output buffer 258 correspond exactly with the consecutive transducer array element 12 (FIG. 1). As indicated above, however, it is not desirable to distribute the carrier frequencies in simple ascending order, but instead it is preferable to mix them randomly. Accordingly, a frequency distribution map 267 is stored in a second read/write memory 268 and is employed by microprocessor 253 to re-order the sixty-four FFT output values in buffer 258. The frequency distribution map 267 stores the numbers 1–64 in the same order as the frequencies are ordered across transducer array 11 (FIG. 1) during the ultrasonic pulse transmission. Microprocessor 253 reads the FFT output values from dual port memory 255 and stores them in the proper order in an output buffer 269 by using the values in frequency distribution map 267 as pointers. For example, the seventh FFT output sample is written to the location in output buffer 269 indicated by the seventh entry in frequency distribution map 267.

Thus, at each firing of transmitter 13 (FIG. 1) to produce a beam, the frequency order used across transducer array 11 (FIG. 1) is written into RAM memory 268 and is used to reorder the resulting echo signal frequency components.

The transformed and reordered I and Q sample values in output buffer 269 are then written to a set of corresponding channel output latches 259 in a transmit beam former circuit 260. Transmit beam former 260 includes sixty-four separate beam delay channels 261 which correspond, respectively, to elements 12 of transducer 11 of FIG. 1 and which each processes the echo signal sample attributable to its associated transducer element 12. Each beam delay channel 261 includes a delay FIFO 262 identical to delay FIFO 204 described above with respect to FIG. 5, and a phase rotator 263 identical to phase rotator 205 described above with respect to FIG. 5. Each beam delay channel 261 provides a delay to the received beam samples at its respective output latch 259 which is appropriate for the transducer element 12 (FIG. 1) to which it corresponds. These delays are calculated by a channel control 264 which receives the current receive beam angle ($\theta$) and range (R) and allocates the calculated delay between the delay FIFOs 262 and the phase rotator 263 as described above.

Referring still to FIG. 6, in the first preferred embodiment the delays produced by the transmit beam former are calculated to provide retrospective dynamic focusing of the transmit beam. The time delays $T_i$ were employed as set forth above in equation (1) when the ultrasonic beam was transmitted so that it was steered in the direction ($\theta$). No focusing delays were employed, however, when the beam was transmitted. As described above, both the beam steering delay and the beam focusing delay are employed in the beam forming section 101 of receiver 14 (FIG. 3) because the range value (R) is known at each sample of the received echo signal and dynamic focusing is possible. The best that can be done at the time of beam transmission, however, is to fix the focus of the transmitted beam at a selected distance $R_T$. By employing the present invention, the changing range value (R) is now available to transmit beam former 260 for each sample it receives. In addition, the receive beam sample has been filtered by the Fourier transform such that each beam delay channel 261 is associated with a particular transducer element 12 (FIG. 1) located at a distance $x_k$ from the center of the transducer array 11 (FIG. 1). Accordingly, the focusing delay $T_k$ of equation (2) can be calculated for each beam delay channel 261 as each beam sample at range (R) is received. These focusing delayed I and Q samples are summed at respective summing points 265 and 266 to produce the dynamically focused transmit beam samples I' and Q' at outputs 125 and 126, respectively.

In the first preferred embodiment of the invention, transmit beam processor 122 (FIG. 3) provides the delays necessary only to accomplish retrospective dynamic focusing of the transmit beam. The output signal of receiver 14 (FIG. 3), therefore, is a stream of digital samples from a single receive beam which has been steered and dynamically focused to precisely track a steered and dynamically focused transmit beam. A higher resolution and higher signal-to-noise ratio (SNR) image results.

In the second preferred embodiment of the invention, transmit beam processor 122 (FIG. 3) performs both dynamic transmit beam focusing and beam steering.

Figure 7:
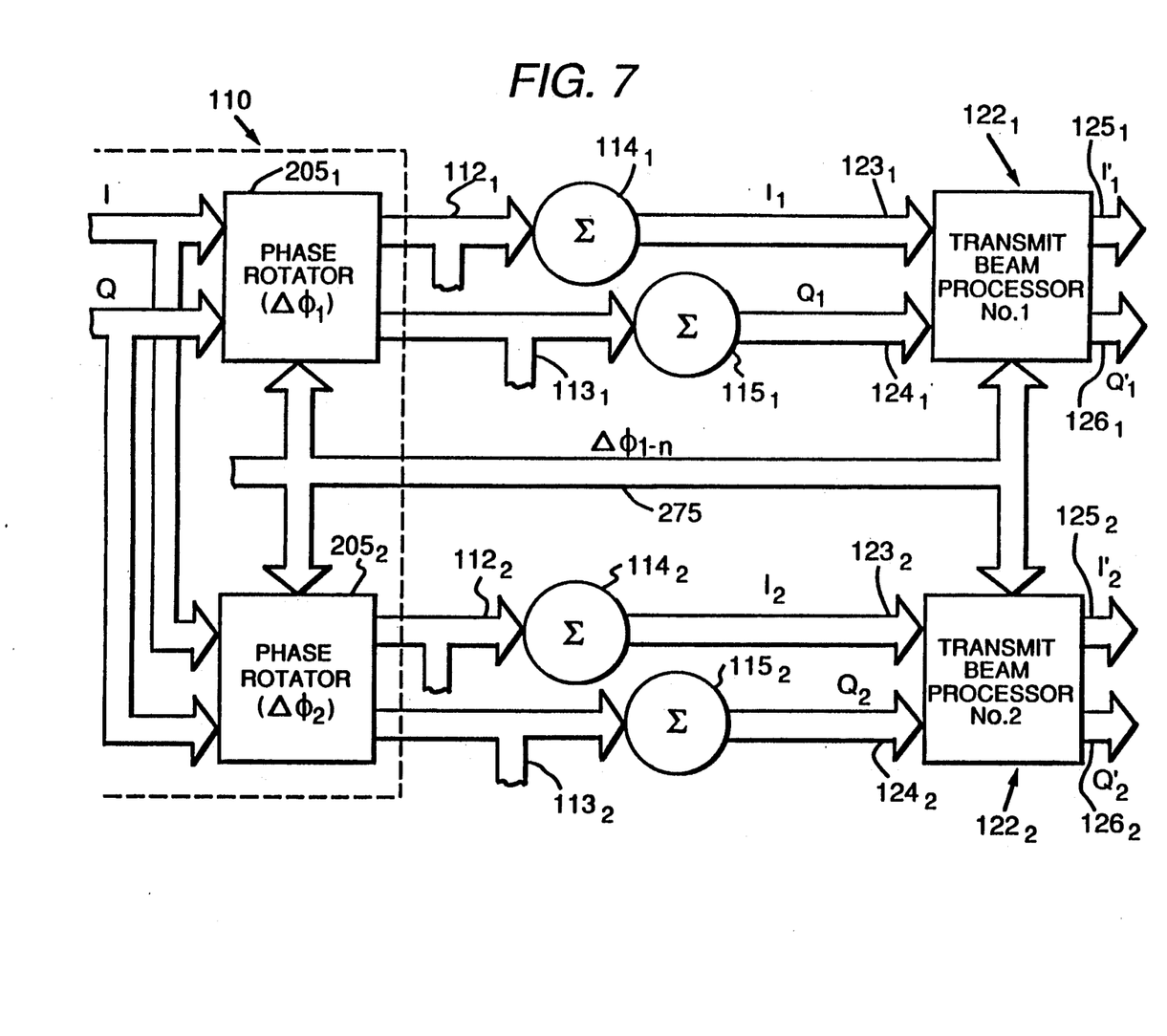
FIG. 7 is an electrical block diagram of an alternative embodiment of the invention which forms part of the receiver of FIG. 3.

Referring particularly to FIGS. 3 and 7, the second preferred embodiment employs the invention described in U.S. Pat. No. 4,886,069 to produce a plurality of receive beams for each received echo signal. This is accomplished by modifying each receiver channel 110 to provide a corresponding plurality of phase rotators $205_{1-n}$ in place of the single phase rotator 205 (FIG. 5). Each phase rotator $205_{1-n}$ provides a different phase shift ($\Delta\phi_{1-n}$) to the beam which effectively produces simultaneous samples from a plurality of receive beams located to each side of the steering angle ($\theta$). The I and Q samples from each of these simultaneously-produced receiver beams are summed at respective summing points $114_{1-n}$ and $115_{1-n}$ as described above for the single receive beam. Each such receive beam is applied to its own transmit beam processor 122 to provide the retrospective transmit beam delays which will now be described. Only two beams and two corresponding transmit beam processors $122_1$ and $122_2$ are shown in FIG. 7 for clarity; however, the concept can be extended to any number (n) of separate beams.

Transmit beam processors $122_{1-n}$ provide the retrospective dynamic focusing delays discussed above with respect to the first embodiment of the invention. This delay is the same in each one of transmit beam processors $122_{1-n}$. In addition, however, each transmit beam processor $122_{1-n}$ also adds a delay which corresponds to the phase shift $\Delta\phi_n$ that is employed in its corresponding receiver channel phase rotator $205_{1-n}$. Referring again to FIG. 6, since each transmit beam processor $122_{1-n}$ has its own phase rotator 263, this retrospective beam steering delay can be accomplished by applying the same phase shift $\Delta\phi_{1-n}$ to that phase rotator 263. This is indicated in FIG. 7 by bus 275 which conveys the phase shift commands $\Delta\phi_{1-n}$ to corresponding transmit beam processors $122_{1-n}$.

The output signal of the receiver in the second preferred embodiment of the invention is a plurality of sampled and focused beam signals which are applied to the display system. These separate beam signals are at different beam angles $\theta + \Delta\theta_n$, where $\Delta\theta_n$ is the beam offset and can be either positive or negative. By employing the present invention, these beam signals are effectively produced with a corresponding plurality of transmitted beams which are dynamically focused to the same range (R) as the received beams and which are steered in the same direction $\theta + \Delta\theta_n$. This is accomplished with a single ultrasonic pulse transmission by frequency encoding the pulses produced by each transducer array element such that the transmit beam steering and focusing can be accomplished retrospectively at the system receiver.

It should be apparent to those skilled in the art that many variations can be made from the preferred embodiments described herein without departing from the spirit of the invention. For example, the transmit beam processor 122 (FIG. 3) is a microprocessor-based system in the presently preferred embodiment, but the functions carried out by the microprocessor may alternatively be performed by a custom integrated circuit. It is, therefore, to be understood that the appended claims are intended to cover all such modifications and changes.

What is claimed is:

1. A coherent vibratory energy beam imaging system comprising:

a transducer array having a set of array elements disposed in a pattern and each being separately operable to produce a pulse of vibratory energy during a transmission mode and to produce an echo signal in response to vibratory energy impinging thereon during a receive mode;

a transmitter coupled to said transducer array and operable during the transmission mode to apply a separate, frequency encoded signal pulse to each array element, respectively;

a receiver coupled to said transducer array and operable during the receive mode to sample the echo signal produced by each array element as the vibratory energy impinges thereon and to form a receive beam signal therefrom by summing the separate echo signals sampled from each array element; and a transmit beam processor coupled to receive the receive beam signal from the receiver and including a) filter means for transforming the receive beam signal into a set of frequency component signals each attributable to the vibratory energy produced by a corresponding one of the separate array elements;

b) a set of beam delays, each one of said delays being associated with a separate respective one of said transducer array elements and being coupled to receive a frequency component signal from the filter means attributable to the transducer array element associated therewith, the beam delays being operable to impart a time delay to each frequency component signal to retrospectively focus the vibratory energy produced during the transmission mode; and c) summing means coupled to receive the delayed frequency component signals from the beam delays and to produce an output signal which is the sum thereof.

2. The coherent vibratory energy beam imaging system of claim 1 wherein the filter means comprises a fast Fourier transform buffer to perform a Fourier transformation on the receive beam signal so as to produce the frequency component signals.

3. The coherent vibratory energy beam imaging system of claim 1 wherein the set of beam delays is operable while the echo signals are being produced to dynamically position, at a controllable range, the focus of the vibratory energy produced during the transmission mode.

4. The coherent vibratory energy beam imaging system of claim 1 wherein said transmitter includes delay means for delaying the separate, frequency encoded signal pulses applied to each array element such that vibratory energy produced during the transmission mode is steered at an angle $\theta$, said beam delay means being operable to retrospectively alter the angle $\theta$ at which the vibratory energy is steered.

5. The coherent vibratory energy beam imaging system of claim 1 wherein said transmitter includes delay means for delaying the separate, frequency encoded signal pulses applied to each array element such that the vibratory energy produced during the transmission mode is steered at an angle $\theta$, said receiver includes means for forming a plurality of beam signals, at least one of which beam signals is steered in a direction different than the angle $\theta$, said transmit beam processor is coupled to receive said one beam signal and the set of beam delays therein is operable to alter the angle $\theta$ to correspond with said different direction.

6. The coherent vibratory energy beam imaging system of claim 5 wherein the set of beam delays is also operable while the echo signals are being produced to dynamically position, at a controllable range, the focus of the vibratory energy produced during the transmission mode.

7. In an ultrasonic imaging system, a method for retrospectively altering a steered and focused transmit beam of ultrasonic energy, comprising the steps of:

a) energizing separate elements of an ultrasonic transducer array with corresponding separate frequency encoded signal pulses so as to transmit ultrasonic energy from each of said elements at a predetermined phase relative to each other;

b) receiving an echo signal produced by each separate element of the ultrasonic transducer;

c) summing the echo signals as they are received to produce a receive beam signal;

d) filtering the receive beam signal to separate it into frequency component signals which are each attributable to the ultrasonic energy produced by a corresponding one of the separate ultrasonic transducer array elements;

e) separately delaying each of the frequency component signals to retrospectively alter the relative phase of the ultrasonic energy transmitted by each separate ultrasonic transducer array element; and f) summing the separately delayed frequency component signals to produce a beam signal.

8. The method of claim 7 wherein the filtering of the receive beam signal comprises Fourier transforming the receive beam signal.

9. The method of claim 7 wherein step e) further comprises altering the relative phases of the frequency component signals in a manner to retrospectively focus the transmit beam, produced in step a), at a controllable range.

10. The method of claim 9 including the step of altering the range at which the transmit beam is retrospectively focused as the echo signals are received.

11. In a vibratory energy imaging system, a method for retrospectively altering a predetermined plurality of steered and focused transmit beams of vibratory energy, comprising the steps of:

a) energizing separate elements of a transducer array with corresponding separate frequency encoded signal pulses so as to transmit said predetermined plurality of beams of vibratory energy from each of said elements at a predetermined phase relative to each other;

b) receiving an echo signal produced by each separate element of the transducer for each of said beams of vibratory energy;

c) summing the echo signals as they are received to produce said predetermined plurality of receive beam signals that are steered in respectively different directions;

d) filtering each one of the receive beam signals to separate them into frequency component signals which are each attributable to the vibratory energy produced by a corresponding one of the separate transducer array elements;

e) separately delaying each of the frequency component signals of each of the receive beam signals to retrospectively alter the relative phases of the vibratory energy transmitted by the separate transducer array elements; and f) summing the separately delayed frequency component signals for each of the receive beam signals so as to retrospectively steer said predetermined plurality of transmit beams.

* * * * *